United States Patent Office 3,503,904
Patented Mar. 31, 1970

3,503,904
SUB REMOVAL FROM POLYESTER SCRAP
Herbert J. Dietz, Webster, and Ronald E. Freese, Rochester, N.Y., assignors to Eastman Kodak Company, Rochester, N.Y., a corporation of New Jersey
No Drawing. Continuation-in-part of application Ser. No. 568,105, July 27, 1966. This application May 28, 1968, Ser. No. 732,504
Int. Cl. C08g 53/22
U.S. Cl. 260—2.3    11 Claims

ABSTRACT OF THE DISCLOSURE

It has been found that certain "subs" can be removed from polyester film scrap in the form of discreet, readily filterable particles if the scrap is treated with hot, alkaline glycol such as ethylene glycol. Temperature, concentration of alkaline materials, and the ratio of scrap to hot glycol are some of the important elements in these processes.

---

This is a continuation-in-part of Ser. No. 568,105 filed July 27, 1966, now abandoned.

The present invention relates to special processes for removing polymeric "sub" layers from polyester bases, and to recovery of polyesters from film base and/or photographic film bearing at least one vinylidene halide copolymeric layer on at least one surface of the polyester base.

In the manufacture of photographic film the usual practice is to coat the film base with one or more thin anchoring substratums, usually less than 0.001-inch thickness, to improve the adhesion of the light-sensitive emulsion layer to film base. The choice of the substratum depends on the characteristics of the material employed for the film base. For example, with polyester type of film bases, the ordinary mixed gelatin-cellulose nitrate compositions show poor adhesion, whereas certain terpolymers of vinyl chloride or vinylidene chloride together with an acid such as itaconic, acrylic or methacrylic acids, have been found to give excellent adherence to the polyester film bases. A considerable amount of scrap film accumulates in the course of manufacture and use so that the recovery of such scrap films is a desirable objective. While in the recovery of photographic film scrap, the emulsion layer can be readily removed, for example, by treating with hot water, the subsequent removal of the substratum presents a much more difficult problem, especially in the case of polyester films wherein a relatively highly hydrophobic terpolymer substratum such as above mentioned is employed. Even small amounts of residual terpolymer substratum interfere with the subsequent use of the treated scrap film.

Several methods for cleaning polyester scrap have been proposed heretofore. See, for example, U.S. Patent 3,047,435 and Canadian Patent 626,996. Previous methods have, in general, involved either the use of an aqueous bath (to effectively "scour" and/or dissolve the "sub" layer from the polyester base), which aqueous bath sometimes contained alkali and/or an appropriate surfactant; or they have involved the complete dissolution of the scrap (and thereby necessitated the subsequent separation of the dissolved materials to ultimately yield polyester material that is essentially free of the troublesome "sub" materials). In any event, previous processes for removing such troublesome "sub" materials from polyester bases required fairly complicated, time-consuming, sometimes expensive process operations (such as a drying step to remove the water from the "aqueous" processes prior to the important subsequent steps in the polyester scrap recovery processes, or crystallizing, filtering, and/or decolorizing steps in those processes involving dissolution of the scrap). Thus, there has existed for some time a pressing need for an improved, potentially less expensive process for removing these special "subs" from polyester bases.

It has now been discovered that subs that are insoluble in alkaline glycols that contain from 2 to 10 carbon atoms such as copolymeric vinylidene halide subs can be effectively and efficiently removed from polyester bases by simply contacting the scrap with a hot solution of a strong base in an appropriate glycol for a fairly short period of time (resulting in the sub "flaking" away from the polyester base), and subsequently separating the cleaned polyester from resulting mixture of flakes or particles of "sub" and hot, strongly alkaline glycol.

In studying the following example, which is intended merely to illustrate the successful practice of the present generic invention, note that several minimum critical factors must be met in order to accomplish the desired result. These "critical minimums" relate to (a) temperature, (b) concentration of alkali, and (c) ratio of hot glycol to scrap.

In all of the following examples, "parts" and percentages given are by weight unless otherwise specified.

EXAMPLE I

Into a conventional stainless steel jacketed reactor fitted with a fairly efficient stirrer are placed 500 parts of chopped, dry scrap consisting of an approximately 4 mil substrate of poly(ethylene terephthalate) coated with a thin layer (1 mil) of a resinous terpolymer of 90% of vinylidene chloride, 8% of methyl acrylate and 2% of itaconic acid. The pieces of scrap vary in size from about 1 to about 10 square inches in surface area. Onto this chopped dry scrap are poured 10,000 parts of hot (150° C.) ethylene glycol containing, dissolved therein, 0.1% of NaOH. The resulting mixture is then stirred for a period of 15 minutes (during which time the temperature of the mixture is maintained at about 150° C.). After only about two minutes flakes of "sub" can be observed beginning to flake away from the particle of polyester. This "flaking" is apparently substantially complete after only about 8 minutes of such treatment. At the end of this "sub removal" period, the resulting mixture (hot basic ethylene glycol flakes of "sub," and particles of cleaned polyester) is poured from the reactor onto a U.S. Standard 10-mesh stainless steel screen. The hot, basic ethylene glycol (containing the flakes of "sub" suspended therein) passes through the screen. Traces of alakaline glycol and flakes "sub" that remain on the scrap particles are then removed by a few subsequent wash steps with pure ethylene glycol. A distinct advantage of the present processes is that the "sub" (in the form of flakes suspended in or intermixed with the hot, strongly alkaline glycol) can readily be separated from the glycol via either a conventional filtration step or a centrifugation step, so that, if desired, the glycol can be recycled into the process again.

The resulting cleaned particles of poly(ethylene terephthalate) can then be utilized as a potential raw material in a commercial process for manufacturing poly(ethylene terephthalate) film base without any substantial further concern about the source or history of the cleaned scrap particles.

The polyester scrap that can best be cleaned via the present processes is material that can contain, in addition to the glyco-insoluble sub such as, for example, the copolymeric vinylidene halide, such usual materials (that are often encountered in scrap materials from photographic film and film base manufacturing processes, for example) as silver halide-gelatine emulsion, small quantities of cellulose nitrate, cellulose esters, carbon, surfactants (dispersion, emulsifying, or spreading agent) diazo materials, various anti-static and static electrical conducting materials and the like, as well as various polymeric materials such as polyvinyl acetate and the like. The scrap must contain, however, as a thin layer adjacent to the polyester base surface itself, a "sub" that is essentially insoluble in hot (up to 150° C.) glycol. A preferred type or class of glycol-insoluble "sub" is a copolymer containing at least about 30 weight percent (based on the weight of the "sub") of a vinylidene halide such as vinylidene chloride, bromide or fluoride. The remainder of the "sub" copolymer should generally contain (a) an alkyl acrylate, methacrylate, or itaconate having from 1 to 18 carbons in the alkyl group (such as methyl acrylate, butyl acrylate, monomethyl itaconate, ethyl methacrylate, monobutyl itaconate, octdecyl methacrylate and the like), and/or (b) an acid such as itaconic, acrylic or methacrylic acid: these two or three classes of components making a total of about 100% of the "sub" layer. Most of these preferred "subs," are essentially either copolymeric or terpolymreic materials containing the following amounts of materials, by weight: (1) vinylidene halide (preferably vinylidene chloride), from about 30% to about 98% (preferably from about 35% to about 96%); (2) acrylonitrile, from about 1% to about 15%; (3) acrylic or methacrylic acid, from about 1 to about 25%, (preferably 1 to 5%); (4) itaconic acid, from about 1 to about 25%, (preferably 1 to 5%); (5) alkyl esters of acrylic, methacrylic and/or itaconic acid, from about 0.5 to about 40% (preferably 5 to 35%). Note that the preferred "subs" contain, in addition to at least about 35% vinylidene chloride, one or more of the other materials named above: preferably one or two. For example, some specifically preferred "subs" include:

(a) 94% vinylidene chloride and 6% monoethyl itaconate.
(b) 96% vinylidene chloride and 4% monomethyl itaconate.
(c) 91% vinylidene chloride and 9% monobutyl itaconate.
(d) 85% vinylidene chloride, 12% acrylonitrile, and 3% acrylic acid.
(e) 60% vinylidene chloride, 15% vinylidene fluoride, 10% acrylonitrile, and 5% acrylic acid.
(f) 50% vinylidene chloride, 30% vinylidene fluoride, 10% methyl acrylate, 5% acrylonitrile, and 5% acrylic acid.

The polyester bases that are useful in the practice of this invention are all of those highly polymeric linear polyester bases (including oriented and heat set polyester bases) that consist of one or more bifunctional aromatic dicarboxylic acids condensed with one or more glycol type compounds. Examples of such dicarboxylic acids include terephthalic acid, isophthalic acid, 4,4′-sulfonyldibenzoic acid, trans-1,4-cyclohexane-dicarboxylic acid, and the like. The "glycol type compounds" referred to above include the series $HO-C_nH_{2n}-OH$, wherein $n$ is a whole number from 2 to 10, with specific examples being ethylene glycol, 1,3-propanediol, 1,4-butanediol, neopentyl glycol, 1,5-pentanediol, 2-methyl-1,3- butanediol, 2,2,4,4-tetramethylcyclobutanediol, 2,2-dimethyl-1,3-propanediol, cis and trans 1,4-cyclohexane-dimethanol, and the like. These polyesters are well known in the art and described in detail in many U.S. patents, including 2,465,319, 2,720,506; 2,627,088, and 2,698,235.

For some as yet unexplained reason, the hot glycol that is utilized in the processes of this invention must be strongly basic in order to function in the desired manner. Apparently, the strong alkalinity is the only requirement for success in this particular aspect of the invention, since the particular source of the strong alkalinity is not at all critical. Any storng base can be used that can be dissolved to the extent of at least about 0.05 weight percent (at 100° C.) in the glycol intended to be used in these processes. The term "strong base" is intended to encompass all of those materials having the aforesaid requisite solubility in the glycol that yield a solution pH measured at 25° C. of at least 9 when they are dissolved in distilled water at the 0.1 weight percent level. Thus, materials that can be dissolved in the glycol to cause its high alkalinity include, for example, the alkali metal oxides, hydroxides, carbonates; the alkaline earth metal oxides and hydroxides; the quaternary ammonium hydroxides; tri-alkali metal orthophosphate; pyridine; and the like. Of these, the alkali metal hydroxides are preferred; while still further preferred are NaOH and KOH.

While, generally it is preferred that from about 0.02 to about 5 weight percent (based on the combined weight of base and glycol) of the strong base (dissolved in the hot glycol) be utilized in these processes, as little as about 0.01 and as much as about 10 weight percent can be used if desired. This amount will vary within these ranges somewhat, depending upon such factors as the actual "strength" of the base, the rate of reaction desired, the particular "sub" being removed, and the like.

Since a certain amount of reaction between the alkaline material and the polyester substratum occurs during the time in which the hot alkalane glycol is maintained in contact with the polyester being treated, the concentration of alkaline material can be expected to vary considerably during the practice of these processes. As a result, the preferred practice of this invention (using alkali metal cation bearing bases) can also be described in terms of the amount of alkali metal cation dissolved in the hot glycol during the contacting period. Thus, generally, at least about 100 p.p.m. of alkali metal cation (preferably $Na^+$ or $K^+$), and preferably at least about 800 p.p.m. of alkali metal cation should be present (dissolved) in the hot glycol during the contacting period of the present processes.

The temperature of the hot, highly alkaline glycol must be at least about 90° C. in order to obtain the desired cleaning within a practical period of time, and can be as high as that temperature at which as much as 5% of the polyester base can be dissolved in the hot glycol. This latter temperature will, of course, vary to some extent, depending upon the particular chemical type of polyester base and the particular hot glycol being employed. In general, however, the temperature of the hot alkaline glycol should be maintained below about 200° C. during the sub removal or "flaking" step of these processes. Thus, when poly(ethylene terephthalate) base is being cleaned with hot alkaline ethylene glycol, the temperature of the hot glycol (during the "flaking" step) should generally be maintained within the range of from about 130° C. to about 175° C., and preferably within the range of from about 145° C. to about 155° C.

Since the hot alkaline glycol appears to be effective almost immediately upon its being brought into contact with the coated polyester film base, and within a fairly short time (for eample within about 2 minutes) a significant amount of "sub" can be observed flaking away from the polyester base, it is apparent that the total amount of time that the hot alkaline glycol and the scrap material remain together is not critical with respect to the successful practice of the invention. Thus, in general, the amount of time (up to about 15 minutes or more) will be determined by the degree of cleanness of the polyester base desired. Greater "contact" times won't necessarily adversely affect the product.

It has also been discovered that, to effectively remove the "sub" from the polyester base in the desired manner, the weight ratio of hot, alkaline glycol must be at least about 6:1. Preferably, it is between about 10:1 and about 50:1; although it can be as high as 1000:1, or more, if desired.

Although it is not essential that the mixture of hot, alkaline glycol and scrap be agitated continuously during the time that they are in mutual contact, agitation at some time during this "contact" period is certainly desirable (to enhance the "flaking" of the "sub" from the polyester base).

No special processing equipment is needed for the successful practice of this invention. All that is needed is (1) a container in which the contacting of hot, alkaline glycol and scrap can be accomplished for the desired length of time; (2) means for agitating the mixture for at least a part of the "contact" period; and (3) means for separating the resulting mixture. In these processes, if the sizes of the pieces of scrap are longer than about ¼ inch( measured across their smallest diameter) the separation step can be performed by simply filtering the mixture through a screen that has a large enough mesh to pass the flakes of "sub" (generally a U.S. Standard 4- or 6-mesh screen is adequate, since the flakes are usually quite small, generally averaging about $\frac{1}{32}$ inch in diameter), but small enough to retain the pieces of scrap.

As indicated in the previous example, fresh glycol can be used, if desired, to wash the pieces of scrap in order to obtain the best possible separation of "sub" material from the polyester base. This glycol can be (but need not be) either basic or relatively pure. A different glycol (or mixture of glycols) from that used in the hot "contact" step can be used in the wash step, if desired.

Any of the aforementioned glycols can be used in the practice of these processes, regardless of the chemical identity of the polyester scrap. However, it is preferred that the hot, alkaline glycol be chemically the same as that of the polyester base. For example, to clean poly(ethylene terephthalate) scrap, it is preferred to use hot, alkaline ethylene glycol; and to clean poly(1,4-cyclohexanedimethanol terephthalate) scrap, it is preferred that hot, alkaline, 1,4-cyclohexanedimethanol be utilized.

Other materials can also be present in the not glycol systems of the present invention without adversely affecting the successful practice thereof. For example, up to 5 weight percent or more of water can be present in the hot glycol. Also, organic dyes and even a small amount of gelatin can sometimes be found in the hot glycol after it has been used for a time in the present processes.

We claim:

1. A process for removing a sub from the surface of polyester scrap; said sub being insoluble in hot glycols containing from 2 to 10 carbon atoms; and said sub comprising a polymer of a vinyl or vinylidene halide which process comprises the steps of,
    (a) contacting said polyester scrap with strongly alkaline glycol containing, dissolved therein, from about 0.01 to about 10 weight percent of a strong base; the amount of said glycol being at least about 6 times the amount of said scrap in the resulting mixture;
    (b) agitating said resulting mixture and maintaining the temperature of said resulting mixture between about 90° C. and the temperature at which 5 weight percent of said polyester can be dissolved in said alkaline glycol, for a period of time sufficient for at least part of said sub to flake away from said polyester base; and
    (c) separating the resulting cleaned polyester base from said glycol; flakes of said sub being retained in the glycol fraction and subsequently being removed from said glycol fraction by a separation step.

2. A process as in claim 1, wherein said polyester scrap consists of a highly polymeric linear polyester film base subbed on at least one surface thereof with a copolymeric vinylidene halide coating composition comprising a polymeric material selected from the group consisting of
    (a) a copolymer of methylacrylate, vinylidene halide and an itaconic acid, said copolymer comprising at least 35 percent by weight of vinylidene halide;
    (b) a copolymer composed of from about 30 to about 98 weight percent of vinylidene halide, from about 1 to about 40 weight percent of a material selected from the group consisting of acrylonitrile and alkyl esters of acrylic, methacrylic and itaconic acids, and from about 1 to about 25 weight percent of an acid selected from the group consisting of acrylic, methacrylic, and itaconic acids; and
    (c) a copolymer comprised of, by weight, from about 10 percent to about 15 percent of acrylonitrile, from about 1 percent to about 12 percent of acrylic acid, and the balance vinylidene halide.

3. A process as in claim 2, wherein said vinylidene halide is vinylidene chloride.

4. A process as in claim 3, wherein said glycol is chemically the same as said glycol type compound: the glycol portion of said polyester base.

5. A process as in claim 3, wherein said strongly alkaline glycol contains, dissolved therein, at least about 100 p.p.m. of alkali metal cations.

6. A process as in claim 5, wherein said alkali metal cations are $Na^+$, $K^+$ or mixtures thereof.

7. A process as in claim 2, wherein said polyester base is poly(ethylene terephthalate).

8. A process as in claim 2, wherein said polyester base is poly(1,4-cyclohexanedimethylene terephthalate).

9. A process for removing a copolymeric vinylidene chloride sub from a poly(ethylene terephthalate) film base coated with said sub which process comprises
    (1) forming a mixture by intermixing one part by weight of particles of said film base with at least about 10 parts by weight of highly alkaline ethylene glycol containing, dissolved therein, at least about 800 p.p.m. of $Na^+$ or $K^+$ derived from NaOH or KOH; said particles being at least about ¼ inch in diameter;
    (2) maintaining the temperature of said mixture within the range of from about 135° C. to about 170° C. for at least about 2 minutes to thereby cause at least part of said sub to flake away from said film base;
    (3) agitating said mixture during at least part of step (2), and (4) thereafter separating said ethylene glycol from the resulting cleaned film base; flakes of said sub being carried with said ethylene glycol during said separating.

10. A process as in claim 9, wherein said vinylidene chloride sub is a copolymer comprised of from about 10 to about 15 weight percent of acrylonitrile, from about 1 to about 12 weight percent of acrylic acid, and from about 73 to about 89 weight percent of vinylidene chloride.

11. A process as in claim 9, wherein said vinylidene chloride sub is a copolymer composed of from about 30 to about 98 weight percent of vinylidene chloride from about 1 to about 40 weight percent of a material selected from the group consisting of acrylonitrile and alkyl esters of acrylic, methacrylic and itaconic acids, and from about 1 to about 25 weight percent of an acid selected from the group consisting of acrylic, methacrylic, and itaconic acids.

References Cited

UNITED STATES PATENTS 2,832,663   4/1958   Drelich _____ 260—2.3 X
3,222,299  12/1965   MacDowell _____ 260—2.3 X SAMUEL H. BLECH, Primary Examiner M. J. TULLY, Assistant Examiner U.S. Cl. X.R.

117—63, 138.8; 134—42; 260—80.8

PO-1050
(5/69)

UNITED STATES PATENT OFFICE
CERTIFICATE OF CORRECTION

Patent No. 3,503,904          Dated March 31, 1970

Inventor(s) Herbert J. Dietz and Ronald E. Freese

It is certified that error appears in the above-identified patent and that said Letters Patent are hereby corrected as shown below:

In the Claims

In column 6, line 40 delete "170°C." and substitute therefor ---175°C.---.

SIGNED AND
SEALED

JUL 14 1970

(SEAL)
Attest:

Edward M. Fletcher, Jr.
Attesting Officer

WILLIAM E. SCHUYLER, JR.
Commissioner of Patents